United States Patent

Garner

[15] 3,707,077
[45] Dec. 26, 1972

[54] METHOD FOR INSTALLATION OF A RISER ON AN OFFSHORE STRUCTURE

[72] Inventor: Norman E. Garner, Houston, Tex.
[73] Assignee: Esso Production Research Company
[22] Filed: Nov. 1, 1971
[21] Appl. No.: 194,147

[52] U.S. Cl. .................................................. 61/72.3
[51] Int. Cl. ........................... F16l 1/00, E21b 15/02
[58] Field of Search .......... 61/72.3, 72.1; 285/18, 24; 166/.5, .6

[56] References Cited

UNITED STATES PATENTS 3,640,080  2/1972  Neal ....................................... 61/72.3
3,658,366  4/1972  Welch, Jr. et al. .................. 61/72.3 X

*Primary Examiner*—Jacob Shapiro
*Attorney*—James A. Reilly et al.

[57] ABSTRACT

A method is disclosed for installing a pipeline riser on an offshore structure situated in a body of water. The technique includes laying a pipeline on bottom having a free end adjacent the base of the structure, positioning a floating vessel over the pipeline, and connecting at least one tension member between the vessel and the pipeline. The free end of the pipeline is raised to a point adjacent the water surface by applying force to the pipeline through each said tension member having a magnitude and direction such that the sum of the vertical force components is sufficient to lift the free end of the pipeline and the sum of the axial components is sufficient to prevent bending stress in the unsupported suspended section from exceeding the allowable stress. A riser bend section is attached to the free end of the pipeline and the pipeline lowered to the bottom as additional sections of the riser are attached. Simultaneously, sufficient axial tension is maintained on the pipeline to prevent the suspended section from being overstressed.

11 Claims, 6 Drawing Figures

INVENTOR.
NORMAN E. GARNER

BY
*James E. Gilchrist*

ATTORNEY

INVENTOR.
NORMAN E. GARNER

BY
ATTORNEY

3,707,077

METHOD FOR INSTALLATION OF A RISER ON AN OFFSHORE STRUCTURE

BACKGROUND OF THE INVENTION

1. Field of the Invention

The present invention is directed to a method for installing a pipeline riser on an offshore structure.

2. Description of the prior Art

Offshore deposits of crude oil and natural gas are frequently produced from wells completed on platforms or similar structures that extend upwardly from the bottom of a body of water. Normally, the wells which tap the subterranean producing formations have their wellheads and associated production equipment positioned on these structures, frequently situated in 100 ft or more of water. Production equipment for phase separation or other treatment of produced fluids may be situated on the platform and produced fluids treated therein and then introduced into a pipeline extending to storage and terminating facilities. An important aspect in constructing such offshore pipelines is the installation of the riser connecting the pipeline to the upper part of the platform. These risers frequently tie in the pipeline on the ocean floor to the production equipment on the platform and normally extend a substantial distance above the bottom.

In shallow water, pipeline risers are normally installed after first laying the pipeline along the bottom to a point adjacent the base of the structure. A pipelaying barge or similar vessel having a number of winches situated along its length is then positioned over the pipeline. Cables or other flexible tension members are lowered from the vessel and connected to the pipeline at points spaced along the pipeline sufficiently close together to prevent the unsupported sections from buckling when the pipeline is lifted off bottom. The pipeline is then lifted at these multiple support points by means of the cables, the riser bend section is attached to its free end, and it is then lowered to bottom as additional riser sections are added. Once the riser extends from bottom to the upper part of the structure, it is clamped or otherwise connected to the structure.

Use of the multiple support technique in deep water with a single vessel becomes impractical since a substantial section of the suspended pipeline would be unsupported and thus would buckle under its own weight. To extend the multiple support technique into deep water a number of additional vessels would be required to provide support at points longitudinally spaced along the pipeline. Because of the adverse economics of such a procedure, an entirely different approach has been employed by the prior art. Axial tensile force is applied to the suspended pipeline through a cable connected to a tug or similar auxiliary vessel located some distance away from the primary vessel employed to raise and lower the pipe. This technique results in application of sufficient axial force to the pipeline to prevent it from buckling, thereby obviating the necessity for supporting the pipeline at multiple points along its longitudinal axis. After the riser is made up and the pipe returned to bottom, the tensioning cable is disconnected and the riser secured to the platform by clamps or other means as in shallow water.

Because of the expense of the additional tug or barge used to apply the axial tensile force, it would be desirable to be able to install a deep water pipeline riser using a single vessel to raise, lower and apply axial force to the line. It would be further desirable that the member used to apply axial force not extend to the opposite side of the structure from the side on which the vessel lifting the pipeline is situated — otherwise, the possibility of fouling the cable will exist throughout the course of the operation. A further advantage to using a single work platform to raise the pipeline, apply an axial tensile force to it and install the riser is the elimination of relative motion, which can hamper welding and other operations attendant to installation of the riser. A need therefore exists for an improved technique for installing a pipeline riser on an offshore structure situated in deep water.

SUMMARY OF THE INVENTION

The method of the present invention alleviates the problems associated with the prior art techniques for installing deep water pipeline risers and permits use of a single vessel for all stages of the operation. In accordance with the method of the invention, a pipeline riser is installed on a structure extending upwardly from a submerged bottom by first laying a pipeline on bottom having a free end adjacent the structure. A floating vessel is positioned over the pipeline and at least one flexible tension member is connected between the vessel and the pipeline. An acute angle is established between at least one such tension member and the longitudinal axis of the pipeline. Force is applied to the pipeline from the floating vessel through at least one flexible tension member having a magnitude and direction such that the vertical component of the total force acting on the pipeline is sufficient to lift the free end of the pipeline off bottom. Simultaneously, force is applied to the pipeline from the floating vessel through at least one flexible tension member having a magnitude and direction such that the axial component of the total force acting on the pipeline is sufficient to prevent bending stress in the unsupported section of pipeline from exceeding the allowable stress level while the pipeline is suspended off bottom. The vertical and axial components of force are applied to the pipeline from the floating vessel until the free end of the pipeline is at least adjacent the water surface. A riser section is attached to the free end and the pipeline is lowered with at least one flexible tension member as additional riser sections are attached. Simultaneously, axial tensile force in the pipeline is maintained at a level sufficient to prevent the suspended section from being overstressed. Conduct of the operation from a single vessel in accordance with the method of the invention provides significant cost savings and, in addition, difficulties stemming from fouling cables and relative motion are alleviated. The present invention therefore offers significant advantages over riser installation techniques available heretofore.

DESCRIPTION OF THE PREFERRED EMBODIMENTS WITH REFERENCE TO THE DRAWINGS

Figure 1:
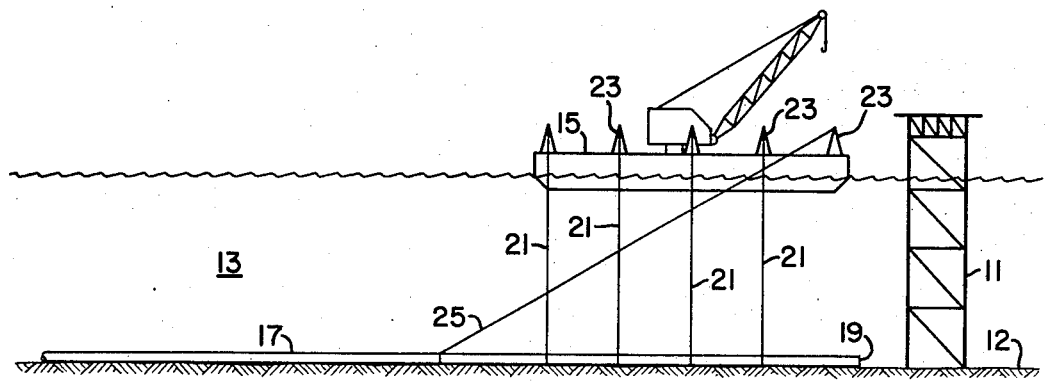
FIG. 1 is an elevation view depicting schematically a pipeline situated on a submerged bottom having a free end adjacent the base of an offshore structure. A pipelaying vessel is positioned above the pipeline and a plurality of flexible tension members extend between the vessel and the pipeline.

Referring now to the drawings in which identical numerals have been used to designate identical parts, FIG. 1 shows a bottom-founded platform 11 which extends upwardly from a submerged bottom 12 through the surface of a body of water 13. A pipelaying vessel 15 is shown positioned near the platform over a pipeline 17 having a free end 19 situated adjacent the base of the platform.

Prior to installing the pipeline riser on the platform, the position of the free end of the pipeline relative to the platform should be ascertained to determine any length correction in the pipeline necessary to assure that the position of the riser after installation will be close enough to the platform to facilitate its attachment. This may conveniently be accomplished by lowering a diver, manipulator or the like to the bottom to measure the distance between the free end of the pipeline and the platform.

Once the length correction is determined, the free end of the pipeline is raised to a point adjacent the water surface to facilitate attachment of the riser. As shown in FIG. 1, a number of substantially vertical, flexible tension members depicted as lifting lines 21 are normally employed to raise the pipeline. These lines are lowered from hoisting apparatus positioned aboard the pipelaying vessel such as davits 23 and are connected to the pipeline by a diver, manipulator or the like. The number of lifting lines employed will normally vary depending on the number of hoists, cranes, davits or the like available along the length of the pipelaying vessel. The primary function of these lifting lines is to provide vertical lifting forces along the pipeline the sum of which is sufficient to raise the free end, ultimately to a point adjacent the water surface. Necessary capacity of individual hoists will therefore be determined by the weight per unit length of the pipeline in water, the water depth and the number of hoists available. Line capacity will similarly depend on the number of lines and the total amount of force to be applied. The lifting lines should be spaced at intervals along the longitudinal axis of the pipeline such that the sections of pipe therebetween will not buckle from their own weight when the pipeline is raised.

While the pipeline is suspended off bottom axial tensile force is applied from the floating vessel through a flexible tension member depicted as axial tensioning line 25 to prevent the unsupported section from being overstressed. As shown in FIG. 1, the axial tensioning line may conveniently be connected between the forwardmost davit 23 aboard the vessel and a point on the pipeline to the rear of the point of attachment of the aftmost lifting line. The smaller the acute angle established between the axial tensioning line and the longitudinal axis of the pipeline, the greater will be the axial component of the tensile force applied through the tensioning line. Decreasing this angle will therefore permit more efficient use of tensile force available on the pipelaying vessel and thus, it will frequently be advantageous to connect the tensioning line to a point on the pipeline as far to the rear of the vessel as is practicable. At the same time, the distance between the point of connection and the aftmost lifting line must be small enough to prevent overstressing the pipe section suspended therebetween. While it frequently will be most efficient if axial force is applied to only the unsupported section of the pipeline, i.e., that section between the point of connection of the aftmost lifting line and the point of departure of the pipeline from the submerged bottom, it will be understood that the tensioning line could be attached at a point a substantial distance forward of this point with some loss in efficiency.

Figure 2:
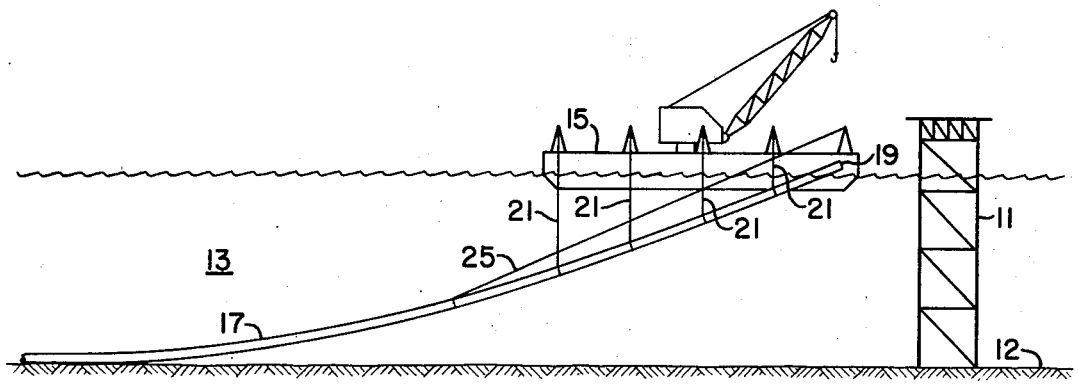
FIG. 2 is an elevation view of the vessel and pipeline of FIG. 1 after the free end of the pipeline has been raised to a point adjacent the water surface.

FIG. 2 depicts the pipeline 17 suspended off bottom with both a single tensioning line 25 acting at an acute angle thereto and several vertical lifting lines 21 connecting it to the vessel. With the free end of the pipeline so situated the length correction is made by either welding on an additional pipe section to the pipeline or cutting off any excess length.

Figure 3:
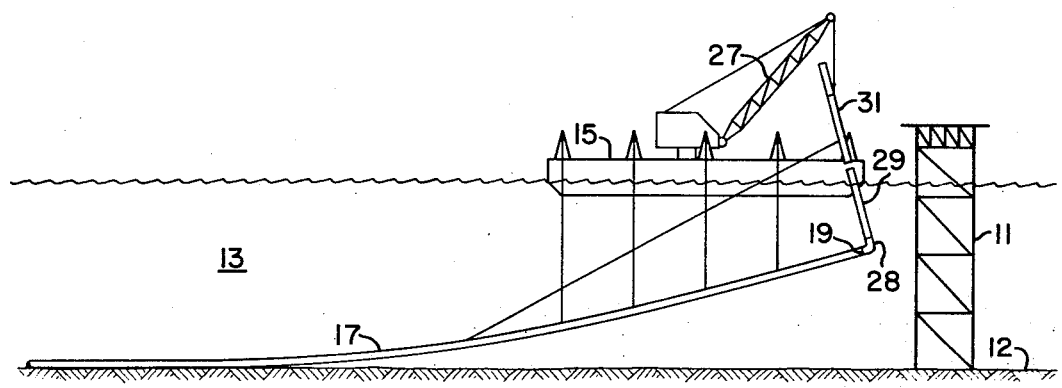
FIG. 3 shows in elevation the vessel and pipeline of FIGS. 1 and 2 with the riser bend attached and the pipeline being lowered to bottom.

FIG. 3 shows the pipeline 17 and vessel 15 of FIGS. 1 and 2 after two riser sections and riser bend 28 are attached to the free end of the pipeline 19 and lowering operations have been initiated. During lowering, the elevation of the pipeline and riser are controlled by lifting lines 21 while tensioning line 25 is used to maintain sufficient axial tension in the section of the pipeline between the point of connection of the aftmost lifting line and the point of departure of the pipeline from the submerged bottom to keep this unsupported section from buckling. A new riser section 29 has just been joined to the upper end of riser bend 28 and lowered into the water. Riser section 31 is about to be lowered into engagement with the upper end of the riser by derrick 27 and rigidly affixed thereto prior to further lowering of the pipeline and riser.

Figure 4:
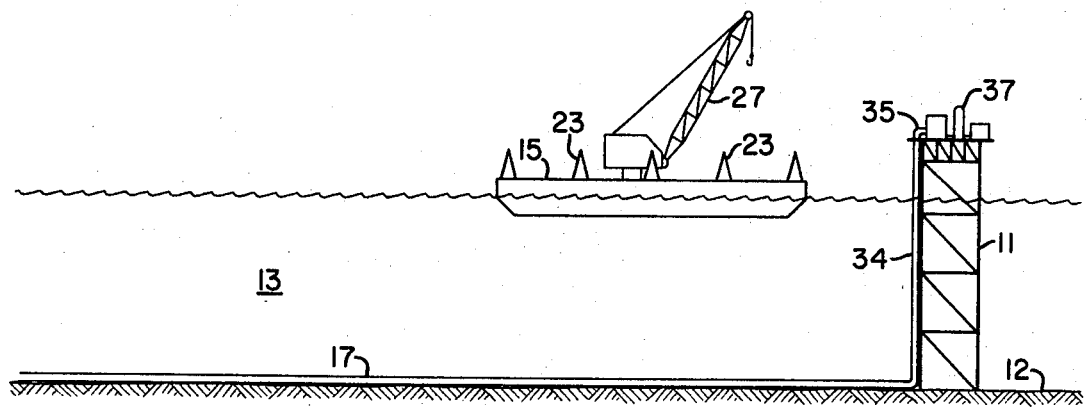
FIG. 4 is an elevation view depicting the pipeline and riser of FIGS. 1 through 3 with the riser installed on the offshore structure.

Once the pipeline is returned to bottom and the riser depicted generally as 34 is positioned adjacent the platform, divers may be lowered to clamp or otherwise attach the riser to platform 11. Pipe connections 35 are then attached to the upper end of the riser to complete the connection of the pipeline to production facilities 37 on the structure. The completed riser is shown in FIG. 4.

While in the embodiment of the present invention depicted in FIGS. 1-4 a plurality of vertical lifting lines and a single angular tensioning line are employed, it will be apparent that the method of the present invention can be carried out in a number of other fashions.

The only constraint with respect to the number and attitude of the flexible tension members connected between the vessel and the pipeline and the magnitudes and directions of the forces applied therethrough from said vessel is that the sum of the vertical components of force must at all times be sufficient to lift the free end of the pipeline off bottom, and the sum of the axial components of force must be sufficient to prevent bending stress in the unsupported suspended section of the pipeline from exceeding the allowable stress of the pipe and thereby causing the pipe to buckle. Thus, the method of the invention could, for example, also be carried out as illustrated in FIG. 5.

Figure 5:
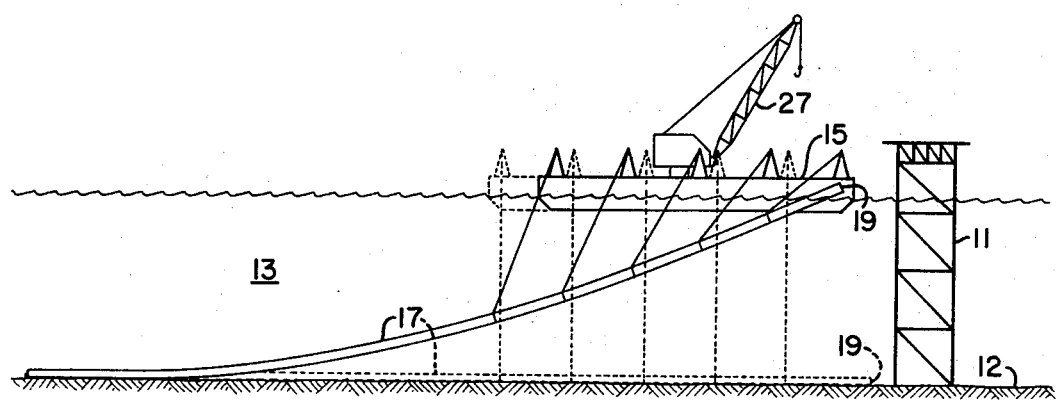
FIG. 5 is an elevation view depicting another embodiment of the method of the invention wherein the pipelaying vessel is advanced after the tension members are connected to facilitate application of axial force.

Shown in phantom view in FIG. 5 is a pipelaying vessel 15 having a plurality of flexible tension members 21 extending vertically between the vessel and pipeline 17 situated on a submerged bottom with its free end 19 adjacent the base of platform 11. Following connection of the tension members to the submerged pipeline, the vessel is advanced from the position shown in phantom view toward the structure whereby an acute angle is established between each of the flexible tension members and the pipeline whereby both vertical and axial force components may readily be applied to the pipeline through the tension members. Once the vessel has been advanced, force is applied to the pipeline from the vessel through the tension members. As the line is lifted toward the surface, the angle between the lines and the pipeline is further reduced causing a further increase in the axial force component relative to the total tensile force. The free end of the pipeline is raised to a point adjacent the water surface by applying force thereto through each tension member having a magnitude and direction such that the sum of the vertical components is sufficient to lift the free end of the pipeline and the sum of the axial components is sufficient to prevent bending stress in the unsupported, suspended section from exceeding the allowable stress. If water depth is great relative to the length of the vessel, after the free end of the pipeline is raised a distance off bottom, the vessel may have to be moved while simultaneously adjusting the length of the lines to assure that the free end is alongside it when it is brought to the surface for attachment of the riser bend. While the length of the lines must be adjusted as the vessel is moved, the forces applied through the lines at each stage in the operation must remain sufficient at all times not only to lift the free end of the pipeline off bottom, but also to impart sufficient axial force to the line to prevent the unsupported section from buckling.

It will be apparent to those skilled in the art that although advancing the vessel to establish an acute angle between the flexible tension members and the pipeline may frequently be most convenient, there exist a number of other methods of achieving the desired result. The flexible tension members could for example be lowered vertically from the vessel and then shifted aft of their normal point of contact with the pipeline prior to connection thereto, whereby an acute angle between each such tension member and the longitudinal axis of the pipeline would be established. It will further be apparent that it is not necessary that all of the flexible tension members interconnecting the vessel and pipeline form an acute angle therewith. Accordingly, in addition to the angular tension members, vertical tension members could also be connected to the pipeline after the vessel is advanced or could be connected at the same time other tension members are shifted aft of their normal vertical point of contact with the pipeline for connection.

Figure 6:
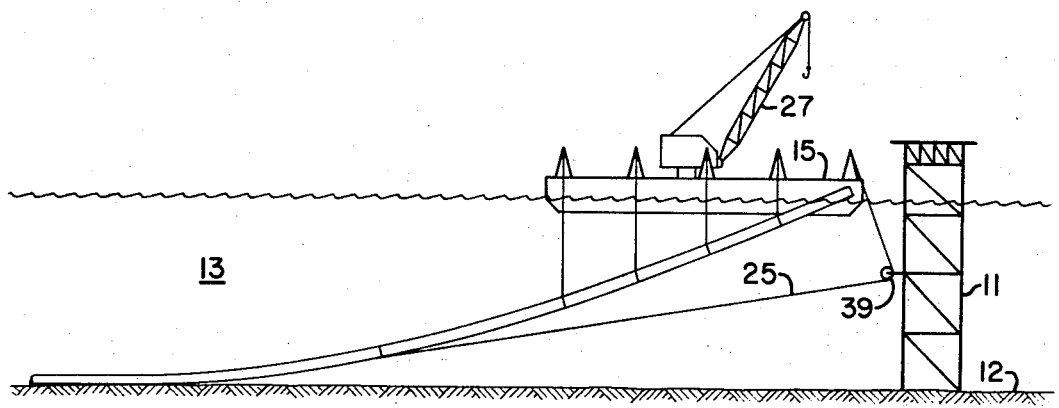
FIG. 6 is an elevation view showing still another embodiment of the method of the invention in which a pulley on the structure is used to facilitate application of axial force.

Still another embodiment of the method of the present invention is depicted in FIG. 6. The tensioning line 25 is strung around a pulley 39 attached to platform 11. By use of the pulley, the angle between the tensioning line and the longitudinal axis of the pipeline is significantly reduced, and axial tension may be more efficiently applied to the pipeline. It will further be apparent that when acting through a pulley situated on the structure the flexible tension member can be readily configured to nearly parallel the pipeline and thereby provide the maximum component of axial force from the available force acting through the member.

It will frequently be most advantageous to use a number of tension members in the fashion discussed above in carrying out the method of the invention. Use of a number of tension members results in reduction in individual line and hoist loads and in a reduction in required axial force because of the relatively short unsupported section. It will be understood, however, that the method of the invention is not limited to the use of multiple flexible tension members and may instead be carried out by using a single flexible tension member to provide both vertical and axial components of force. In such applications the relative force that must be applied through the line is, of course, substantially greater, the unsupported length of pipe longer and the angle between the tension member and the pipeline therefore more critical. It is desirable to connect the single tension member to a point near the free end of the pipeline to minimize the length of the unsupported pipe section between the point of connection of the tension member and the free end. At the same time, however, this has the effect of increasing the angle between the tension member and the axis of the pipeline, rendering it more difficult to generate the desired axial tension. In moderate water depths it may be desired to employ a boom with a pulley on it positioned forward of the bow to increase the effective axial tension. In deeper water a pulley situated on the platform as shown in FIG. 6 may be used or the vessel may be advanced as described in relation to FIG. 5 to overcome this difficulty. In all other respects riser installation with a single flexible tension member is like that described in relation to FIGS. 1–4.

It will be apparent from the foregoing that the method of the invention has numerous advantages over methods employed heretofore. It makes possible the use of a single vessel for installation of a pipeline riser on an offshore structure, permitting significant cost savings, eliminating problems from relative motion and alleviating difficulties with fouling lines on the offshore platform.

What is claimed is:

1. A method of installing a pipeline riser on an offshore structure extending upwardly from a submerged bottom comprising:

a. laying a pipeline on the bottom having a free end adjacent the structure;

b. positioning a floating vessel over the pipeline;

c. connecting at least one flexible tension member between the vessel and the pipeline and establishing an acute angle between at least one such tension member and the longitudinal axis of said pipeline;

d. applying force to said pipeline from said floating vessel through at least one such flexible tension member having a magnitude and direction such that the vertical component of the total force acting on said pipeline is sufficient to lift the free end of the pipeline off bottom;

e. simultaneously applying force to said pipeline from said floating vessel through at least one such flexible tension member having a magnitude and direction such that the axial component of the total force acting on said pipeline is sufficient to prevent the unsupported, suspended section of said pipeline from buckling while said pipeline is off bottom;

f. continuing to apply said vertical and axial components of force to said pipeline from said floating vessel until the free end of the pipeline is at least adjacent the water surface;

g. connecting a section of riser pipe to the free end of the pipeline; and h. lowering the pipeline to bottom while connecting additional sections of riser pipe thereto and simultaneously maintaining the axial component of force applied to the pipeline at a level sufficient to prevent the unsupported, suspended section from buckling.

2. A method according to claim 1 wherein said vertical and axial components of force are applied to said pipeline by means of a plurality of substantially vertical tension members and a single tension member acting at an acute angle with respect to the longitudinal axis of said pipeline.

3. A method according to claim 2 wherein the point of connection of said single tension member is between the point of connection of the aftmost vertical tension member and the point of departure of the pipeline from the submerged bottom.

4. A method according to claim 2 wherein said single tension member acts through a pulley situated on said offshore structure.

5. A method according to claim 1 wherein a plurality of substantially vertical tension members are connected between said vessel and said pipeline and an acute angle is established between each said tension member and the longitudinal axis of the pipeline by advancing said vessel toward said offshore structure.

6. A method according to claim 5 wherein a second plurality of substantially vertical tension members are connected between said vessel and said pipeline after said vessel is advanced.

7. A method according to claim 1 wherein a plurality of flexible tension members are connected between said vessel and said pipeline at points spaced along said pipeline such that each said tension member forms an acute angle with the longitudinal axis of the pipeline.

8. A method according to claim 7 wherein a plurality of substantially vertical flexible tension members are additionally connected between said vessel and said pipeline at points spaced longitudinally along said pipeline.

9. A method according to claim 1 wherein said vertical force component and said axial force component are applied by means of a single flexible tension member connected between said vessel and said pipeline and establishing an acute angle with the longitudinal axis of said pipeline.

10. A method according to claim 7 wherein said single flexible tension member acts through a pulley situated on said offshore structure.

11. A method according to claim 7 wherein said single flexible tension member acts through a pulley situated on a boom mounted on said vessel.

* * * * *